UNITED STATES PATENT OFFICE.

HENRY A. KOHMAN, TRUMAN M. GODFREY, AND LAUREN H. ASHE, OF PITTSBURGH, PENNSYLVANIA, ASSIGNORS TO WARD BAKING COMPANY, OF NEW YORK, N. Y., A CORPORATION OF NEW YORK.

METHOD OF PRODUCING A SHORTENING COMPOSITION.

1,242,884.  Specification of Letters Patent.  Patented Oct. 9, 1917.

No Drawing.  Application filed March 9, 1916.  Serial No. 83,198.

*To all whom it may concern:*

Be it known that we, HENRY A. KOHMAN, TRUMAN M. GODFREY, and LAUREN H. ASHE, all citizens of the United States, residing at Pittsburgh, Allegheny county, State of Pennsylvania, have invented certain new and useful Improvements in Methods of Producing Shortening Compositions; and we do hereby declare the following to be a full, clear, and exact description of the invention, such as will enable others skilled in the art to which it appertains to make and use the same.

The present invention relates to a method of producing a shortening composition by the impregnation of flour or other absorbent material with a hard fat of high melting point.

The hard fat of high melting point which is utilized in producing the shortening composition may be either of vegetable or animal origin, as, for instance, hydrogenated edible vegetable oil (say, hydrogenated cotton-seed oil, hydrogenated edible animal oil, or oleo-stearin). In most instances the use of hydrogenated cotton-seed oil is preferred, or other hydrogenated vegetable oil of an edible character, for the reason that such hydrogenated oils are relatively cheap, and can be hydrogenated or hardened up to a high melting point readily and conveniently. Thus, cotton-seed oil having a melting point of about 57° C., is well adapted to the purposes of the invention.

According to the novel method of the present invention, the hard fat is brought into homogeneous admixture with flour by heating to a high temperature *e. g.* at about 200°C. or higher and by absorbing the molten fat, in the form of a fine spray or cloud, by the flour. Thus, melted fat may be supplied from a suitable melting and heating receptacle or the like to a discharge pipe from which it may be ejected, at a correspondingly high temperature, in the form of a fine spray or cloud, by a jet of air of appropriate temperature, volume and pressure, into an inclosed chamber. Into this chamber the flour may be sifted in a disseminated falling body; whereupon the colder particles of flour, coming in contact with the highly heated particles of fat sprayed into the chamber, take up the fat. The flour thus impregnated with the melted fat remains in a pulverulent condition, after cooling. It is found that by repeating the absorbing operation a number of times, upon the same body of flour, a quantity of flour from five to ten times the weight of the fat is sufficient to absorb the fat and yet remain in a pulverulent condition. The resulting composition will accordingly contain the flour and fat in homogeneous admixture and with the flour impregnated with the fat, or with the fat absorbed by the flour.

The shortening composition produced as above described is of particular value for use in the manufacture of leavened bread, but it is available for use in the manufacture and production of other food products where a shortening agent is desired.

In the manufacture of leavened bread, it is found that, with equally good results as to color, texture and expansion, a quantity of the shortening composition produced as above described can be used containing an amount of hard fat equal to approximately 1/20th the weight of the cotton-seed oil used ordinarily in making up the dough batch. Thus, in those instances where from two to three per cent. of cotton-seed oil (calculated, by weight, on the amount of flour employed in the dough batch) is used, 1/20th of that percentage, by weight, of hydrogenized cotton-seed oil, having a melting point of 57° C., may be used, in the form of the shortening composition above described with like advantage as to the shortening effects desired, and with the production of a stiffer and springier dough, the viscosity of the dough being maintained, even though the absorption is increased, and the resultant baked loaf having the desired amount of moisture to give it the freshness and flavor desired.

It will be understood that, instead of using flour as the absorbent carrier for the melted hard fat, in the method of the present invention, we may employ any other suitable pulverulent carrier, appropriate as an ingredient of the shortening composition, as, for instance, some other starchy materials.

What we claim is:

1. The method of making a pulverulent shortening composition, which comprises bringing a hard fat of high melting point into homogeneous admixture with a pulverulent carrier, said homogeneous admixture being induced by breaking up the fat while heated to a high temperature, into a finely divided form, and absorbing the same by the pulverulent carrier; substantially as described.

2. The method of making a pulverulent shortening composition, which comprises bringing a hard fat of high melting point into homogeneous admixture with a pulverulent carrier, said homogeneous admixture being induced by first melting the fat and heating it to a high temperature, atomizing the heated fat into a fine spray or cloud, and absorbing the same in a disseminated body of the pulverulent carrier; substantially as described.

3. The method of making a pulverulent shortening composition, which comprises bringing a hard fat of a melting point of about 57° C. into homogeneous admixture with a pulverulent carrier, said homogeneous admixture being induced by melting and heating the fat to a temperature of about 200° C. or higher, ejecting the fat with a suitable gaseous jet into an inclosed chamber and absorbing the resulting finely divided fat in a disseminated falling body of the pulverulent carrier; substantially as described.

4. The method of making a pulverulent shortening composition, which comprises bringing a hard fat of high melting point into homogeneous admixture with a pulverulent carrier, said homogeneous admixture being induced by first melting the fat and heating it to a high temperature, atomizing the heated fat into a fine spray or cloud, absorbing the same in a disseminated body of the pulverulent carrier, and repeating the absorbing operation a number of times with the same body of pulverulent carrier; substantially as described.

5. The method of making a pulverulent shortening composition, which comprises bringing a hard fat of high melting point into homogeneous admixture with a pulverulent carrier, said homogeneous admixture being induced by first melting the fat and heating it to a high temperature, atomizing the heated fat into a fine spray or cloud, absorbing the same in a disseminated body of the pulverulent carrier, and repeating the absorbing operation with the same body of pulverulent carrier until the carrier has absorbed from about one fifth to one tenth its weight of the fat, substantially as described.

In testimony whereof we affix our signatures.

HENRY A. KOHMAN.
TRUMAN M. GODFREY.
LAUREN H. ASHE.